United States Patent
Blodgett, Jr.

(10) Patent No.: US 6,971,489 B2
(45) Date of Patent: Dec. 6, 2005

(54) REMOVABLE MOTOR BRAKE FOR USE WITH VEHICLE SLIDE OUT

(75) Inventor: Raymond Willis Blodgett, Jr., Norco, CA (US)

(73) Assignee: RBW Industries, Inc., Chino, CA (US)

(*) Notice: Subject to any disclaimer, the term of this patent is extended or adjusted under 35 U.S.C. 154(b) by 0 days.

(21) Appl. No.: 10/720,324

(22) Filed: Nov. 21, 2003

(65) Prior Publication Data

US 2004/0104698 A1 Jun. 3, 2004

Related U.S. Application Data

(60) Provisional application No. 60/430,425, filed on Dec. 2, 2002.

(51) Int. Cl.$^7$ ................................................. H02P 3/00
(52) U.S. Cl. ....................... 188/171; 188/216; 188/158; 296/26.01; 310/77
(58) Field of Search ..................... 188/67, 171, 216, 188/158, 161–163, 173, 106 P; 310/93, 77; 29/596, 732; 296/26.01–26.15; 318/367; 52/67

(56) References Cited

U.S. PATENT DOCUMENTS

| | | | | | |
|---|---|---|---|---|---|
| 2,949,172 | A | * | 8/1960 | Simons | 188/171 |
| 2,966,240 | A | * | 12/1960 | Aude et al. | 188/171 |
| 3,045,782 | A | * | 7/1962 | Hansen | 188/171 |
| 3,605,958 | A | * | 9/1971 | McCarthy | 188/171 |
| 3,688,877 | A | * | 9/1972 | Day | 188/166 |
| 4,798,269 | A | * | 1/1989 | Lindner et al. | 188/171 |
| 4,938,321 | A | * | 7/1990 | Kelley et al. | 188/171 |
| 5,796,192 | A | * | 8/1998 | Riepl | 310/67 R |
| 5,915,507 | A | * | 6/1999 | Maurice et al. | 188/171 |
| 6,675,940 | B2 | * | 1/2004 | Maurice | 188/171 |
| 2004/0104698 | A1 | * | 6/2004 | Blodgett, Jr. | 318/367 |

* cited by examiner

*Primary Examiner*—Douglas C. Butler
(74) *Attorney, Agent, or Firm*—Inskeep IP Group, Inc.

(57) ABSTRACT

A motor and brake assembly having a disengaging mechanism for use with RV's are disclosed. The assembly includes a motor and a disengaging mechanism that is mounted thereon. The disengaging mechanism includes a motor mount comprised of a cylindrical piece with a plurality of holes disposed on the periphery of an outer flange of the cylindrical piece. The cylindrical piece extends over the barrel of the motor and is secured to the barrel with a plurality of screws. Through manipulation of the cylindrical piece, the user can selectively engage or disengage the brake from the motor.

17 Claims, 4 Drawing Sheets

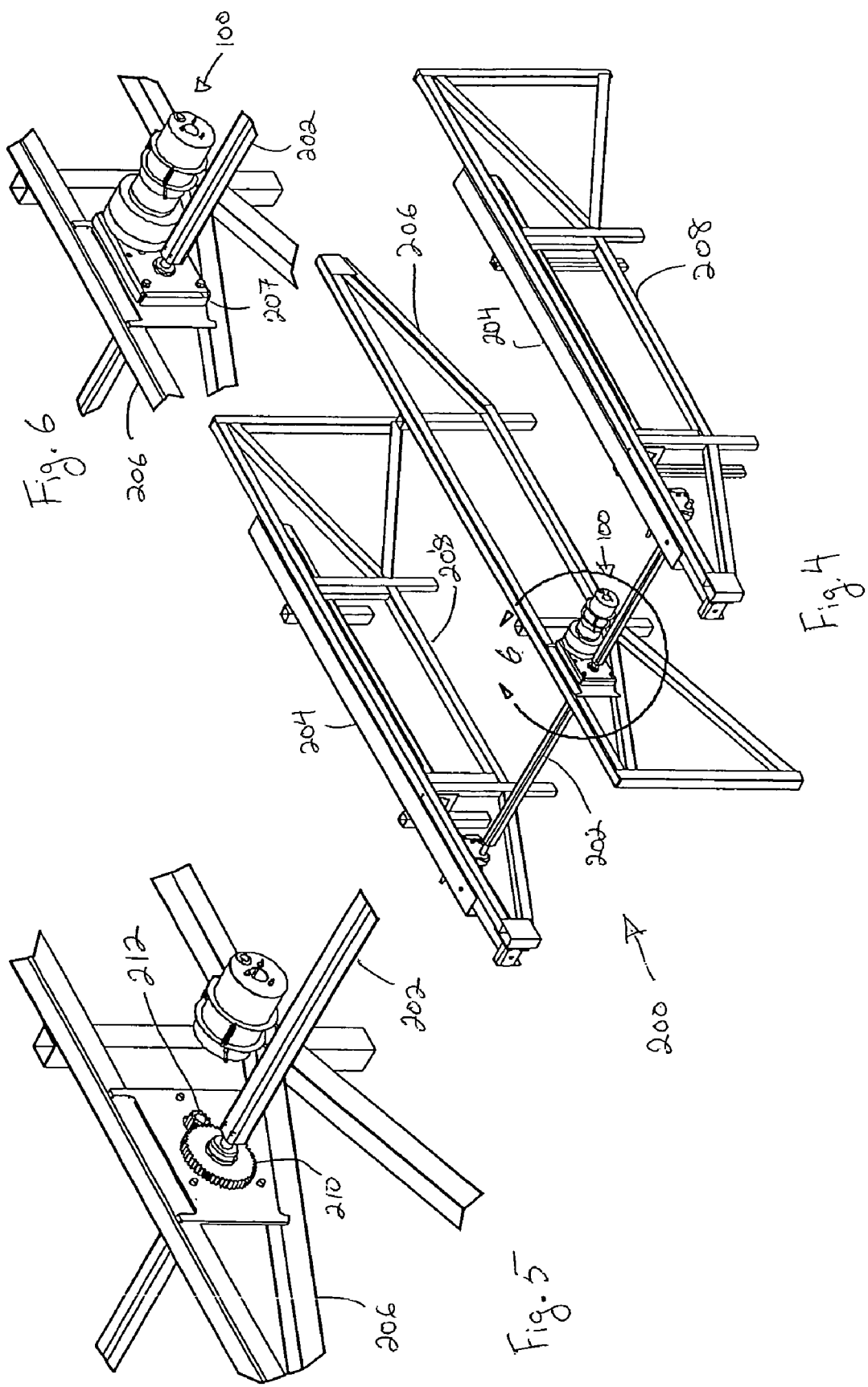

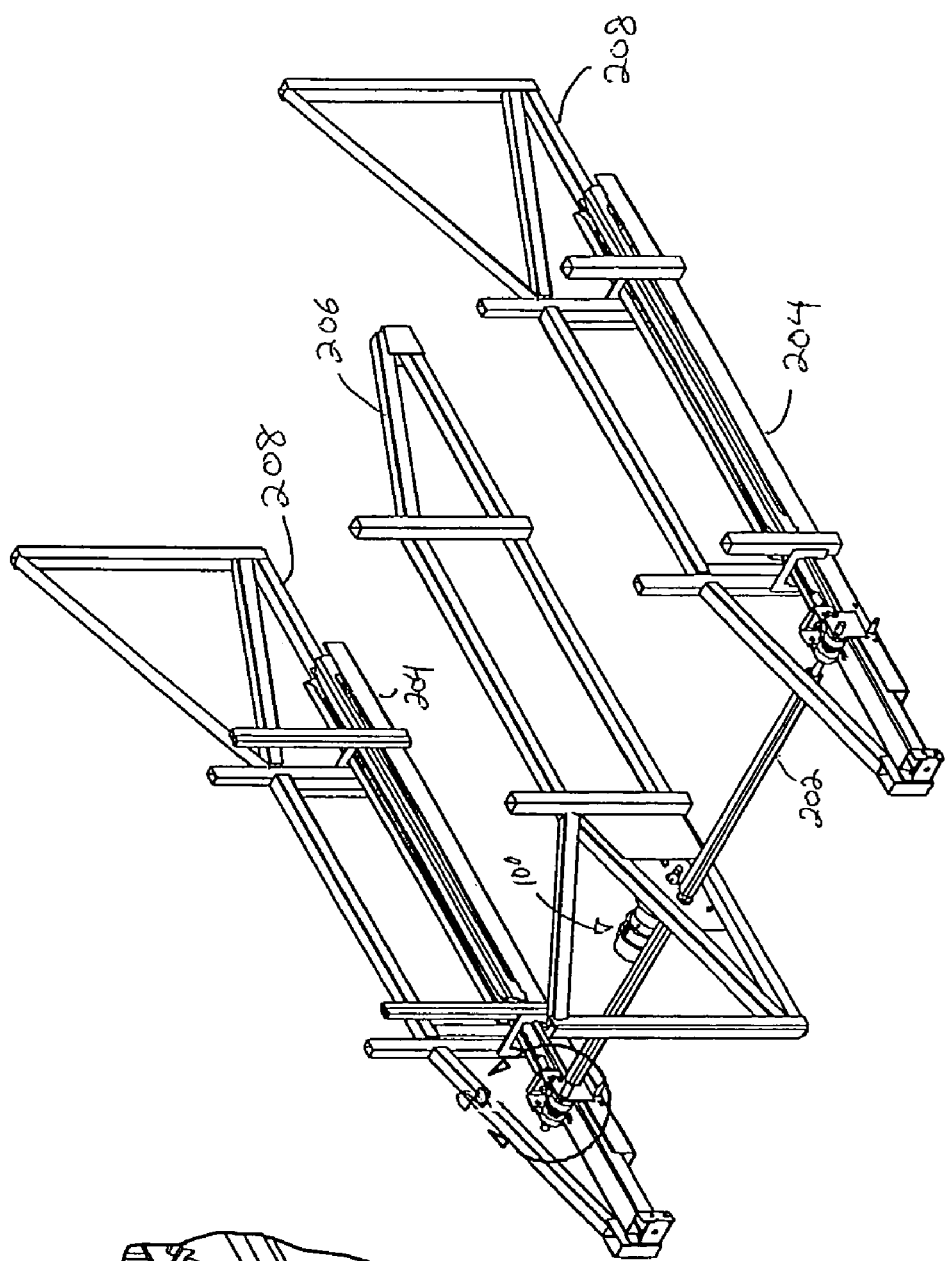
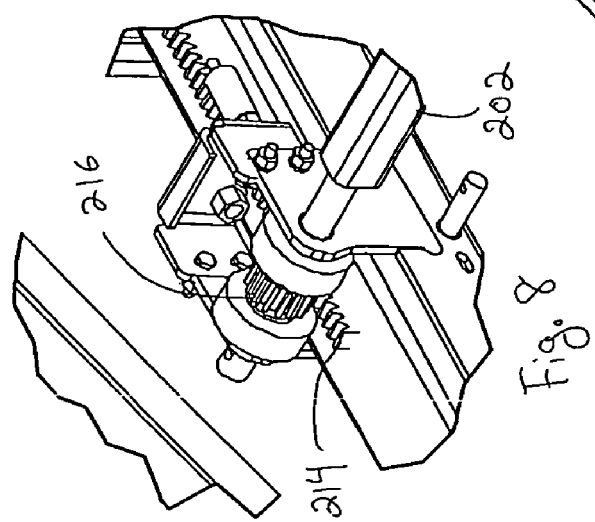
Fig. 7
Fig. 8

REMOVABLE MOTOR BRAKE FOR USE WITH VEHICLE SLIDE OUT

CROSS REFERENCE TO RELATED APPLICATIONS

This application claims priority to U.S. provisional application Ser. No. 60/430,425 filed on Dec. 2, 2002 entitled Removable Motor Brake For Use With Vehicle Slide Out, the contents of which are hereby incorporated herein by reference.

BACKGROUND OF THE INVENTION

A large number of recreational vehicles and recreational trailers (collectively "RV's") currently include compartments that are moved outwardly from the walls of the RV so as to expand the internal living space of the RV. These compartments are typically referred to as slide-outs. It is not uncommon for such slide-outs to substantially enlarge a bedroom or a kitchen area of the RV.

Many of the slide-outs are operated on the RV with an electric motor that is connected to the structural framework of the slide-out. When energized, the motor causes the framework to move along a guide or pathway until the framework extends to its fullest extension, at which point the motor is then deenergized.

Such motors typically include a brake mechanism as an integral part of the motor such that when the motor ceases its operation, the brake automatically engages the slide-out so as to ensure no further movement of the framework of the slide-out. The engagement of this brake, however, can pose problems to the user in those instances when the motor inadvertently fails or in the event electrical power to the motor is unexpectedly interrupted. In those circumstances, the user may desire to move the slide-out manually but will be unable to do so unless the brake is first disengaged. As a result, there is a need for a manual mechanism that enables the user to quickly and easily disengage the brake from the motor so that the user may then manually move the slide-out.

SUMMARY AND OBJECTS OF THE INVENTION

In accordance with this need, the present invention contemplates a motor and brake assembly described in preferred embodiments below. The assembly includes a motor and a disengaging mechanism that is mounted thereon.

It is an object of the present invention to provide a slide-out motor brake which may be manually disengaged.

It is a further object of the present invention to provide an inexpensive motor brake which may be easily and reliably disengaged.

These and other objects not specifically enumerated here that are achieved by the present invention will become evident as more fully described below.

BRIEF DESCRIPTION OF THE DRAWINGS

FIG. 4 illustrates a perspective view of a preferred embodiment of the motor brake of the present invention mounted within a typical slide-out assembly;

FIG. 5 illustrates a perspective view of a preferred embodiment of the motor brake slide-out gearing of the present invention;

FIG. 6 illustrates a perspective view of a preferred embodiment of the motor brake slide-out gearing coupled to the motor of the present invention;

FIG. 7 illustrates a perspective bottom view of a preferred embodiment of the of the slide-out assembly and motor brake of the present invention;

FIG. 8 illustrates a perspective bottom view of a preferred embodiment of the movable ram gearing of the present invention.

DETAILED DESCRIPTION OF THE INVENTION

Figure 1:
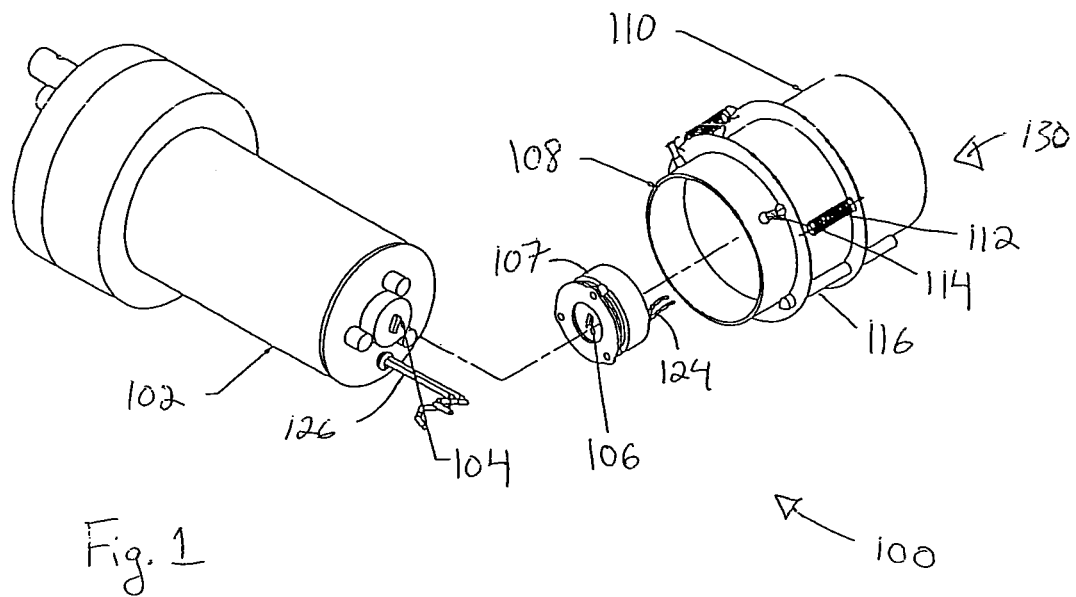
FIG. 1 illustrates a perspective view of a preferred embodiment of a disassembled motor brake according to the present invention.

Referring to FIG. 1, a preferred embodiment of the present invention is depicted. A braking motor assembly 100 is made up of a slide-out motor 102 and a removable braking assembly 130. The motor power cables 126 extend out the backside of the slide-out motor 102, to a control switch and power supply (not shown). A motor key 104 is located on the backside of motor 102, near the motor power cables 126. The motor key 104 is coupled to the drive shaft within the motor. As the motor is energized, the drive shaft rotates. And as the drive shaft rotates, so does the motor key 104.

A variety of motors may be used, so long as the motor is capable of driving the slide-out mechanism on the vehicle and so long as it has a drive shaft coupled to a motor key. The key serves as an engagement surface for said external brake.

Figure 2:
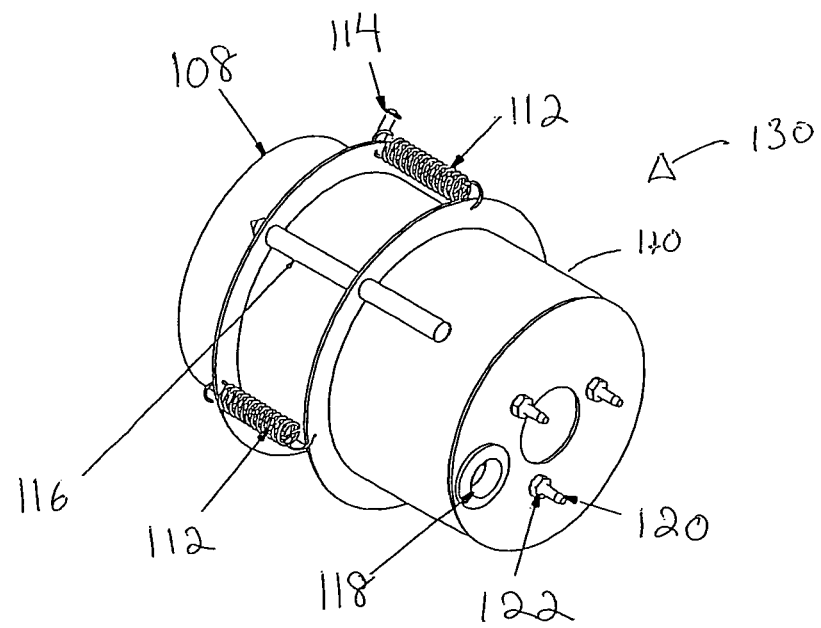
FIG. 2 illustrates a perspective view of a preferred embodiment of the brake assembly according to the present invention.

The brake assembly 130 is best illustrated in FIGS. 1 and 2. A preferred embodiment includes a motor mount 108, a brake housing 110, and a motor brake 107. An exemplary motor brake 107 for use in a preferred embodiment is a brake manufactured by Stearns a division of Rexnord Industries of Wisconsin, model number #b130 OBJY2.

Figure 3:
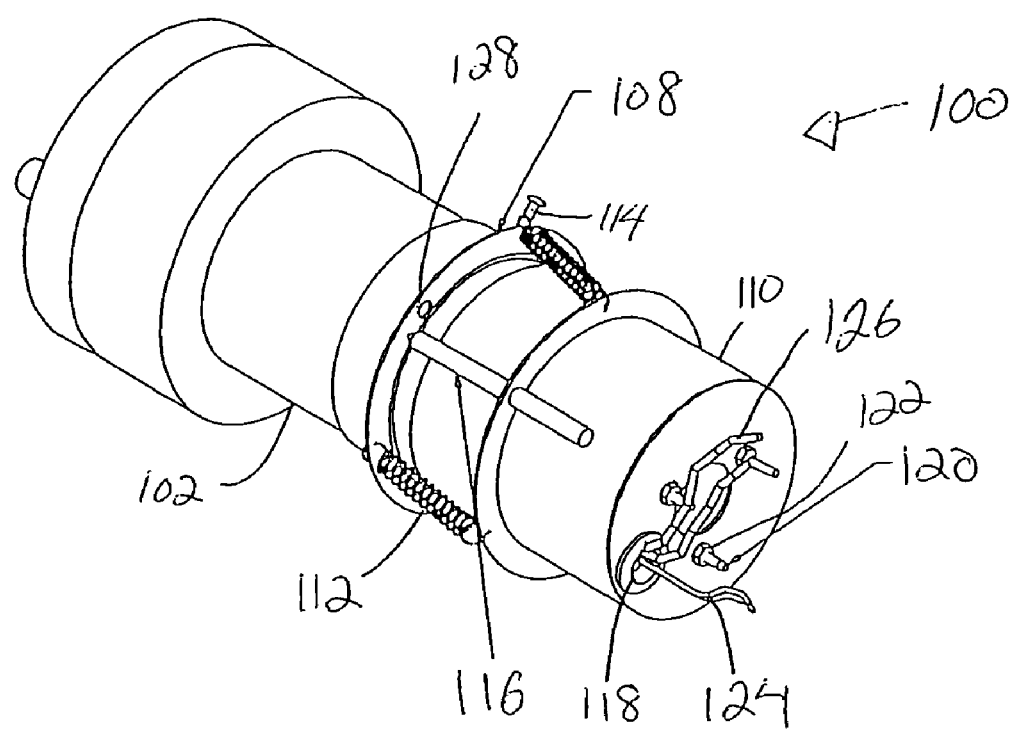
FIG. 3 illustrates a perspective view of a preferred embodiment of the disengaged motor brake of the present invention.

The motor mount 108 is a cylindrical member having a plurality of screw holes disposed on the periphery of the cylindrical member. The cylindrical member extends over the barrel of the motor 102, as best seen in FIG. 3. Mounting screws 114 screw into the plurality of screw holes and further into the barrel of the motor 102, securing the motor mount 108 to the motor.

The brake housing 110 has a cylindrical shape, fitting over both the motor 102 barrel and the motor mount 108. The brake housing 110 locks to the motor mount 108 by multiple locking pins 116 which extend through pin holes 128 in the flange of motor mount 108. The motor mount 108 and brake housing 110 are further secured together by the force of springs 112 which, when attached to the flanges of each member are held in tension, thus compressing the motor mount 108 and the brake housing 110 together.

The motor brake 107 can best be seen in FIG. 1 with a key hole 106 and brake power wires 124 extending out the back. The motor brake 107 is mounted to the interior of brake housing 110 by mounting bolts 120 and mounting nuts 122.

When assembled, motor key 104 is received into key hole 106 of the motor brake 107. When the motor 102 is unenergized, the brake 107 defaults to the locked position, preventing the key hole 106 from rotational movement and thus preventing movement of the motor drive shaft. As a result, the slide-out mechanism is prevented from movement. When the motor 102 is energized, the motor brake 107 is caused to unlock, thus allowing the keyhole 106 to freely rotate with the rotation of the key 104. This then allows free rotation of the motor drive shaft so as to move the slide-out mechanism inwardly or outwardly from the vehicle. In summary, so long as the key 104 is engaged in the key hole 106 of the motor 102, the state of the brake 107 will then dictate whether the slide-out mechanism can be moved by the drive shaft of the motor 102.

Brake assembly 130 may be positioned in an engaged and disengaged position. FIG. 2 illustrates the brake assembly 130 in an engaged position and shows that the engaged position is achieved when the locking pins 116 are positioned within the pin holes 128 in the motor mount 108, preventing rotation of the brake housing 110. In this engaged position, the key 104 of the motor 102 will be engaged within the key hole 106 of the brake 107.

FIG. 3 illustrates the unengaged position of this embodiment. The brake assembly 130 is disengaged by manually pulling the brake housing 110 directly away from the motor mount 108 until the locking pins 116 are completely removed from the pin holes 128. The brake housing 110 is then rotated in either direction. Such rotation prevents the brake assembly from moving back to the engaged position, since the pins 116 and the pin holes 128 are no longer aligned. This movement of the brake assembly 130 also disengages the key hole 106 of the motor brake 107 from the motor key 104 of the motor 102, thus resulting in free rotation of the drive shaft of the motor 102.

Many slide-out mechanisms operate in a fashion similar to the mechanism described herein. Generally these mechanisms have sliding members that slide back and forth on nonmoving members or vehicle structural supports. A slide-out room secures to these moving members, allowing for extension and retraction from the main body of the vehicle.

FIGS. 4 through 7 illustrate a preferred embodiment of such a slide-out mechanism 200 mentioned above. Outer structural members 208 support most of the load of a slide-out room (not shown), while inner structural member 206 provides a mounting area for the braking motor assembly 100. This mounting area can best be seen in FIG. 5 where the motor 102 has been removed to show a drive gear 212 and a shaft gear 210, as well as in FIG. 6 where a motor gear housing 207 encloses this gearing while securing the braking motor assembly 100.

The slide-out room (not shown) sits on a top surface of sliding rams 204, being further fastened to each ram 204 with bolts. The rams 204, in turn, are slidably coupled to the top side of the outer structural members 204, extending a substantial length of each. Thus, the rams 204 allow a slide-out room to easily extend out from the main body of a vehicle.

A present preferred embodiment of the slide-out mechanism is driven by the braking motor assembly 100, mounted to the inner structural member 206. The braking motor assembly 100 drives the entire slide-out mechanism 200 from the inner structural member 206 by a series of distribution gears and shafts.

Beginning with the braking motor assembly 100, the drive shaft of motor 102 is coupled to drive gear 212. Drive gear 212 meshes with shaft gear 210, located on the cross shaft 202. The cross shaft 202 is responsible for transferring the rotational energy of the motor 102 to each of the sliding rams 204. Rotational movement is further transferred to the cross shaft 202 since the shaft gear 210 is mounted around the cross shaft 202.

The cross shaft 202 is rotatably mounted within both the outer structural members 208 and inner structural member 206. As the cross shaft 202 rotates, it drives ram gear 216, as best seen in FIG. 8. Positioned underneath the sliding ram 204 is ram gear 216, allowing the gear to mesh with ram gear track 214. The ram gear track 214 extends the length of the underside of each sliding ram and in this manner allows the ram gear 216 to move the sliding ram 204 and thus the slide-out room to an extended or retracted position.

Another popular slide-out mechanism design can be seen in U.S. Pat. No. 6,428,073, the contents of which are hereby incorporated by reference. It is understood that the present invention may utilize a variety of different slide-out mechanisms as long as they are motorized or are capable of becoming motorized.

A disengaging mechanism of the preferred embodiment operates as follows: In the event the user determines that the motor 102 is not usable (e.g. loss of power, motor failure, etc.) and the brake 107 must be disengaged, the user simply pulls on the brake housing 110 (against the force of the springs 112) in a direction away from the motor 102 until the motor key 104 on the drive shaft of the motor disengages the brake keyhole 106 of the brake 107. After pulling a certain distance, the pins 116 will be withdrawn from their corresponding pin hole 128 in the flange of the motor mount 108. Next, the user will rotate the brake housing 110 a sufficient distance (either clockwise or counter clockwise) so that neither the brake key hole 106 nor the elongated pins 116 are in alignment with the motor key 104 and pin holes 128 respectively.

The user then releases the grip on the brake housing 110 causing the tip of the pin 116 to engage the flange on the motor mount and thereby preventing the brake assembly 130 from reengaging with the motor 102. With the motor 102 now being free from the brake 107, the user then is able to manually move the slide-out framework without further resistance from the motor brake.

The user reengages the brake assembly 130 by again pulling the brake housing 110 (against the force of the springs 112) in a direction away from the motor 102 until the locking pins 116 no longer apply pressure to the flange of motor mount 108. The user then rotates the brake housing 110 until the locking pins 116 are once again aligned with their corresponding pin holes 128. Next, the user releases the brake assembly 130, allowing locking pins 116 to enter the corresponding pin holes 116 and brake housing 110 to move closer to motor mount 108. As the brake housing 110 moves closer to the motor 102, the motor brake 107 also moves closer to the motor 102 until key hole 106 reengages with key 104. Once the key hole 106 has reengaged with key 106, braking motor assembly 100 once again operates as mentioned above, allowing the brake 107 to lock the motor 102 when the motor 102 is powered down, thus locking the slide-out room in place when not being extended or withdrawn.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A motor brake assembly for a slide out mechanism comprising:
   a motor;
   a brake attachment assembly comprised of a bracket and a brake housing;
   said bracket configured to mount to said motor;
   said brake housing configured for movable engagement with said bracket, said brake housing having an engagement member sized and shaped to lock with said bracket and thereby substantially prevent relative rotational movement between said bracket and said brake housing when said bracket and said brake housing are engaged;
   a motor brake engageable with said motor;
   said motor brake mounted within said brake housing;
   a biasing member connecting said brake housing to said bracket and allowing said selective engagement of said brake housing with said bracket such that said brake housing is movable between a first position where said brake and said motor are engaged and a second position where said brake and said motor are disengaged.

2. The motor brake assembly of claim 1, wherein said bracket includes a flange having a hole positioned to receive said engagement member.

3. The motor brake assembly of claim 1, wherein said motor brake is positioned at an inner rear location of said brake housing.

4. The motor brake assembly of claim 1, wherein said motor brake includes a recess sized and shaped to receive a protruding drive shaft member of said motor.

5. The motor brake assembly of claim 1, wherein said biasing member is a spring.

6. The motor brake assembly of claim 1, wherein said bracket is cylindrical in shape and sized to fit over a portion of said motor.

7. A releasable brake system for a slide-out comprising:
   a motor having an internal drive shaft;
   an external coupling member located at an end of said internal drive shaft;
   a self-contained brake assembly;
   said self-contained brake assembly including a receptacle for receiving said external coupling member of said motor;
   a bracket;
   said self-contained brake assembly fixed in said bracket;
   said bracket being elastically mounted on said motor such that said bracket is selectively movable between a first position on said motor wherein said external coupling member of said motor is located within said receptacle of said self-contained brake assembly and a second position on said motor wherein said external coupling member of said motor is spaced away from said receptacle of said self-contained brake assembly.

8. The releasable brake system of claim 7, wherein said bracket includes a first housing member and a second housing member, said self-contained brake assembly being positioned in said second housing member.

9. The releasable brake system of claim 8, wherein said first and second housing members are elastically connected to each other with at least one spring.

10. The releasable brake system of claim 8, further comprising an alignment member disposed on said second housing member and an alignment member receptacle disposed on said first housing member, the engagement of said alignment member and said alignment member receptacle substantially preventing relative rotation between said first and second housing members.

11. The releasable brake system of claim 10, wherein said alignment member is an elongated pin.

12. The releasable brake system of claim 10, wherein said alignment member receptacle is a pin hole.

13. A method of manually releasing a motor brake for a slide-out comprising:
   providing a motor having a self-contained brake mounted thereon;
   selectively moving said self-contained brake between a first biased position where said self-contained brake is located adjacent to and engaged with said motor and a second biased position where said self-contained brake is spaced away and disengaged from said motor; and,
   retaining said self-contained brake on said motor when said self-contained brake is in said first position and said second position.

14. A method according to claim 13, further comprising a performance of a manual operation on said slide out when said self-contained brake is in said second position.

15. A method according to claim 13, wherein the retaining of said self-contained brake includes retaining said self-contained brake on said motor when said self-contained brake is being moved between said first and second position.

16. A method according to claim 13, wherein the providing of a motor having the self-contained brake mounted thereon includes providing a self-contained brake that is urged into engagement with said motor with a spring.

17. A method according to claim 13, further comprising preventing relative rotation between said motor and said self-contained brake when said self-contained brake is in said first position.

* * * * *